United States Patent
Ortmann et al.

(10) Patent No.: US 8,565,990 B2
(45) Date of Patent: Oct. 22, 2013

(54) VEHICLE AND METHOD FOR CONTROLLING ENGINE START IN A VEHICLE

(75) Inventors: Walter Joseph Ortmann, Saline, MI (US); Daniel Scott Colvin, Farmington Hills, MI (US); Brandon R. Masterson, Dexter, MI (US); Reid Alan Baldwin, Howell, MI (US); Andrew John Silveri, Royal Oak, MI (US); Francis T. Connolly, Ann Arbor, MI (US); Marvin Paul Kraska, Dearborn, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 813 days.

(21) Appl. No.: 12/617,991

(22) Filed: Nov. 13, 2009

(65) Prior Publication Data

US 2011/0118915 A1    May 19, 2011

(51) Int. Cl.
*G06F 7/00* (2006.01)
*G06F 17/00* (2006.01)
*G06F 19/00* (2011.01)

(52) U.S. Cl.
USPC ........... 701/67; 701/1; 701/36; 701/68

(58) Field of Classification Search
None
See application file for complete search history.

(56) References Cited

U.S. PATENT DOCUMENTS

| | | | |
|---|---|---|---|
| 4,335,429 A | 6/1982 | Kawakatsu | |
| 5,343,970 A | 9/1994 | Severinsky | |
| 5,681,242 A | 10/1997 | Bates | |
| 5,916,061 A | 6/1999 | Koyama et al. | |
| 5,982,045 A * | 11/1999 | Tabata et al. | 290/17 |
| 6,018,198 A | 1/2000 | Tsuzuki et al. | |
| 6,077,186 A * | 6/2000 | Kojima et al. | 477/3 |
| 6,171,211 B1 * | 1/2001 | Ortmann et al. | 477/62 |
| 6,176,807 B1 * | 1/2001 | Oba et al. | 477/5 |
| 6,176,808 B1 * | 1/2001 | Brown et al. | 477/5 |
| 6,253,127 B1 | 6/2001 | Itoyama et al. | |
| 6,274,943 B1 * | 8/2001 | Hasegawa et al. | 290/40 C |
| 6,336,889 B1 * | 1/2002 | Oba et al. | 477/5 |
| 6,342,027 B1 * | 1/2002 | Suzuki | 477/5 |
| 6,364,807 B1 | 4/2002 | Koneda et al. | |
| 6,394,208 B1 * | 5/2002 | Hampo et al. | 180/65.25 |

(Continued)

FOREIGN PATENT DOCUMENTS

| | | |
|---|---|---|
| GB | 2413998 A1 | 11/2005 |
| JP | 2000115911 A | 4/2000 |

(Continued)

OTHER PUBLICATIONS

Japanese Office Action dated Jan. 12, 2010 pp. 1-3.

(Continued)

*Primary Examiner* — Bhavesh V Amin
(74) *Attorney, Agent, or Firm* — David B. Kelley; Brooks Kushman P.C.

(57) ABSTRACT

A vehicle includes a motor/generator, a starter motor, a disconnect clutch disposed between the engine and the motor/generator, and at least one clutch disposed between the motor/generator and the vehicle drive wheels. When an engine start is requested, various parameters are controlled to ensure a smooth engine start wherein driveline torque disturbances are minimized. The starter motor is used to crank the engine upon an engine start request, thereby eliminating the need to transfer torque from the motor/generator to the engine. This helps to further reduce torque disturbances in the driveline when the engine is started.

17 Claims, 6 Drawing Sheets

U.S. PATENT DOCUMENTS

| | | | |
|---|---|---|---|
| 6,524,219 B2 | 2/2003 | Mesiti et al. | |
| 6,581,705 B2 | 6/2003 | Phillips et al. | |
| 6,585,066 B1 | 7/2003 | Koneda et al. | |
| 6,602,164 B2 | 8/2003 | Yoshiaki et al. | |
| 6,655,485 B1 | 12/2003 | Ito et al. | |
| 6,722,230 B2 | 4/2004 | Sakamoto et al. | |
| 6,823,954 B2 | 11/2004 | Shimabukuro et al. | |
| 6,941,198 B2* | 9/2005 | Brigham et al. | 701/22 |
| 6,962,224 B2 | 11/2005 | Nakanowatari | |
| 7,115,064 B2* | 10/2006 | Masterson et al. | 477/3 |
| 7,143,851 B2* | 12/2006 | Masterson | 180/65.25 |
| 7,351,182 B2* | 4/2008 | Kobayashi | 477/5 |
| 7,370,715 B2* | 5/2008 | Colvin et al. | 180/65.28 |
| 7,472,769 B2* | 1/2009 | Yamanaka et al. | 180/65.25 |
| 7,617,808 B2* | 11/2009 | Aswani et al. | 123/179.3 |
| 7,784,575 B2* | 8/2010 | Yamanaka et al. | 180/65.275 |
| 2001/0005805 A1 | 6/2001 | Saotome et al. | |
| 2002/0063002 A1 | 5/2002 | Lasson | |
| 2002/0179047 A1 | 12/2002 | Hoang et al. | |
| 2005/0121239 A1 | 6/2005 | Tsuneyoshi et al. | |
| 2005/0273225 A1* | 12/2005 | Brigham et al. | 701/22 |
| 2007/0102211 A1 | 5/2007 | Nozaki et al. | |
| 2007/0259755 A1 | 11/2007 | Tanishima | |
| 2008/0119975 A1 | 5/2008 | Yamazaki et al. | |
| 2008/0242498 A1* | 10/2008 | Miller et al. | 477/5 |
| 2008/0302324 A1* | 12/2008 | Aswani et al. | 123/179.3 |
| 2009/0171538 A1 | 7/2009 | Kadota | |

FOREIGN PATENT DOCUMENTS

| | | |
|---|---|---|
| JP | 2000125414 A | 4/2000 |
| JP | 2000255285 A | 9/2000 |
| JP | 2001263209 A | 9/2001 |
| JP | 2002309982 A | 10/2002 |
| JP | 200554858 A | 3/2005 |
| JP | 2006306210 A | 11/2006 |
| JP | 2007069790 A | 3/2007 |
| WO | 03086804 A1 | 10/2003 |
| WO | 2007102776 A1 | 9/2007 |

OTHER PUBLICATIONS

Colvin Dan, et al., Challenges of Engine Starts and Drivability in a Parallel Hybrid-Electric System, SAE Technical Paper Series 2004-01-0063, Mar. 8-11, 2004, pp. 1-12.

Office Action of Japanese Serial No. 2005-378163 dated Mar. 17, 2009, pp. 1-3.

http://www.Volkswagenag.com/vwag/vwcorp/info_center/en/news/2007/09/more_drivability_fewer_emissions.html, pp. 1-6.

* cited by examiner

VEHICLE AND METHOD FOR CONTROLLING ENGINE START IN A VEHICLE

BACKGROUND OF THE INVENTION

1. Field of the Invention

The present invention relates to a vehicle and a method for controlling engine start in a vehicle.

2. Background Art

Hybrid electric vehicles (HEV's) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or if the battery state of charge (SOC) drops below a certain level, the engine must start quickly and smoothly in a manner that is nearly transparent to the driver.

One method of controlling engine start in an HEV is described in U.S. Pat. No. 7,370,715 issued to Colvin et al. on 13 May 2008, which is hereby incorporated herein by reference. In an HEV, the engine may be initially cranked by an electric motor that may also output torque to propel the vehicle. When the vehicle is being propelled by the motor, and an engine start is requested, it is desirable to control the powertrain—i.e., the engine, motor, transmission, etc.—such that torque is transferred from the motor to the engine without substantially disrupting the flow of torque from the motor to the vehicle wheels. This can be particularly problematic when the engine is first being cranked because this is when the engine torque requirements are highest and torque disturbances can occur. Therefore, a need exists for a vehicle, and a method for controlling engine start in a vehicle, that reduces or eliminates driveline torque disturbances when the engine is started.

SUMMARY OF THE INVENTION

Embodiments of the present invention include a vehicle having an engine, an electric machine, for example, a traction motor, or a motor/generator (M/G), that can output torque to the engine and to the vehicle wheels, and a starter motor operatively connected to the engine. The starter motor can be used to provide torque to start the engine without the addition of torque from the M/G. This isolates the M/G during engine start and eliminates torque disturbances that would otherwise occur when torque was transferred from the M/G to the engine to assist the engine start.

One type of control system and method that uses torque from both an electric machine and a starter motor to start an engine is described in U.S. patent application Ser. No. 12/617,896, filed on 13 Nov. 2009, which is incorporated herein by reference. One difference found in the present invention is that it does not connect the M/G to the engine until after the starter motor has successfully started the engine. Although a clutch disposed between the engine and M/G may be in a position for rapid engagement—i.e., the clutch plates have some drag between them—any torque transferred from the M/G to the engine is negligible, and is not relied on to assist with engine start.

Although the present invention, which exclusively relies on the starter motor to provide engine starting torque, may be best suited for a direct injection (DI) engine, it can also be used with other types of engines, such as a port injection engine. In addition, vehicles and methods of the present invention may function more efficiently when the engine crankshaft is stopped at a predetermined position, or within a predetermined range of positions, rather than at a random angular position. This can facilitate a more efficient, easier engine start when only the starter motor is used for engine start.

In some embodiments, a method of the present invention may be employed when the vehicle is moving at a relatively steady speed. In such a case, a disconnect clutch disposed between the electric machine and the engine can be initially engaged using a solenoid, for example, a variable force solenoid, commanded by a controller, such as a transmission control module (TCM). The initial engagement of the disconnect clutch can be a "rapid fill" characterized by an initial high pressure increase, which brings the disconnect clutch pressure to a first level.

The pressure in the disconnect clutch can then be reduced to a second level to what is commonly referred to as a "stroke pressure". The stroke pressure is the amount of pressure necessary to move a clutch piston or the clutch plates to just at the point of contact. At the stroke pressure, the clutch is slipping, but it is ready to be quickly engaged. In this way, the M/G is ostensibly isolated from the engine, and the vehicle occupants will not be subject to torque disturbances resulting from torque being transferred from the M/G to the engine during engine start.

Although the operation of the clutch described above uses the term "pressure", thereby implying a hydraulic clutch, other types of clutches, such as electromechanical clutches may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches described herein will be in terms of "pressure", though it is understood it includes situations where a non-hydraulic force is applied to the clutch plates in a non-hydraulic clutch.

In some embodiments, the starter motor is operated substantially simultaneously with the start of the initial fill of the disconnect clutch. After the engine is fueled and engine start is detected, the pressure level of the disconnect clutch can be raised to lock the disconnect clutch and connect the M/G to the engine. In order to isolate the vehicle wheels from disturbances that may occur during the transfer of torque from the M/G to the engine when the disconnect clutch is engaging or engaged, one or more clutches disposed between the M/G and the vehicle wheels can be caused to slip.

In the situation described above, where the vehicle is operating at substantially steady speed when the engine start is requested, a launch clutch may be controlled to provide a certain amount of slip between the M/G and the vehicle wheels. Embodiments of the present invention do, however, also contemplate starting the engine at a time when a downshift in a transmission gear has been requested. In such a situation, there will be one or more transmission clutches that are being released from engagement, and one or more transmission clutches that are in the process of being engaged. These oncoming and offgoing clutches are typically controlled in accordance with a production shift schedule programmed into a control system having a controller, such as a TCM. When the engine start is requested during a downshift, the oncoming and offgoing clutches can be controlled according to the production shift schedule, or some other shift schedule, such that slip occurs between the M/G and the vehicle drive wheels, thereby isolating the drive wheels from torque disturbances as the engine is started.

Embodiments of the invention also include a method for starting an engine in a vehicle having a starter motor for rotating the engine to facilitate an engine start, an electric machine, a disconnect clutch disposed between the engine and the electric machine for selectively connecting the engine to the electric machine, and at least one other clutch disposed between the electric machine and the vehicle drive wheels. The at least one other clutch may be, for example, a launch clutch such as described above, or one or more transmission clutches that are controlled according to a shift schedule.

After the engine start is requested, the disconnect clutch is provided with an initial fill to bring its pressure to a first level. As discussed above, the initial fill may be a rapid fill with an initial high pressure, or a solenoid/clutch system may be used that rapidly begins to actuate the clutch without the high pressure associated with a conventional "rapid fill". Operation of the starter motor is initiated substantially simultaneously with the start of the initial fill of the disconnect clutch. This provides torque transfer from the starter motor to the engine without any torque transfer from the electric machine to the engine. The engine is fueled, an engine start is detected, the starter motor is turned off, and the disconnect clutch is fully engaged. Engine start is now complete.

Embodiments of the present invention also include a vehicle having an engine, a starter motor for rotating the engine to facilitate an engine start, an electric machine, such as a M/G, operable to propel the vehicle, and a first clutch disposed between the engine and the M/G for selectively connecting the engine to the M/G. The first clutch may be, for example, a disconnect clutch as described above. The vehicle also includes a control system that has at least one controller, for example, a TCM as described above. The control system may further include additional controllers, such as an engine control unit (ECU), a vehicle system controller (VSC), and a powertrain control module (PCM), each of which may be connected to the TCM through a network such as a controller area network (CAN). The control system may be configured to perform an engine start such as described above, wherein the starter motor is controlled to crank the engine until it is started. The control system can also control an amount of slip between the M/G and the vehicle wheels as the first clutch is being engaged.

DETAILED DESCRIPTION OF EMBODIMENTS OF THE INVENTION

Figure 1:
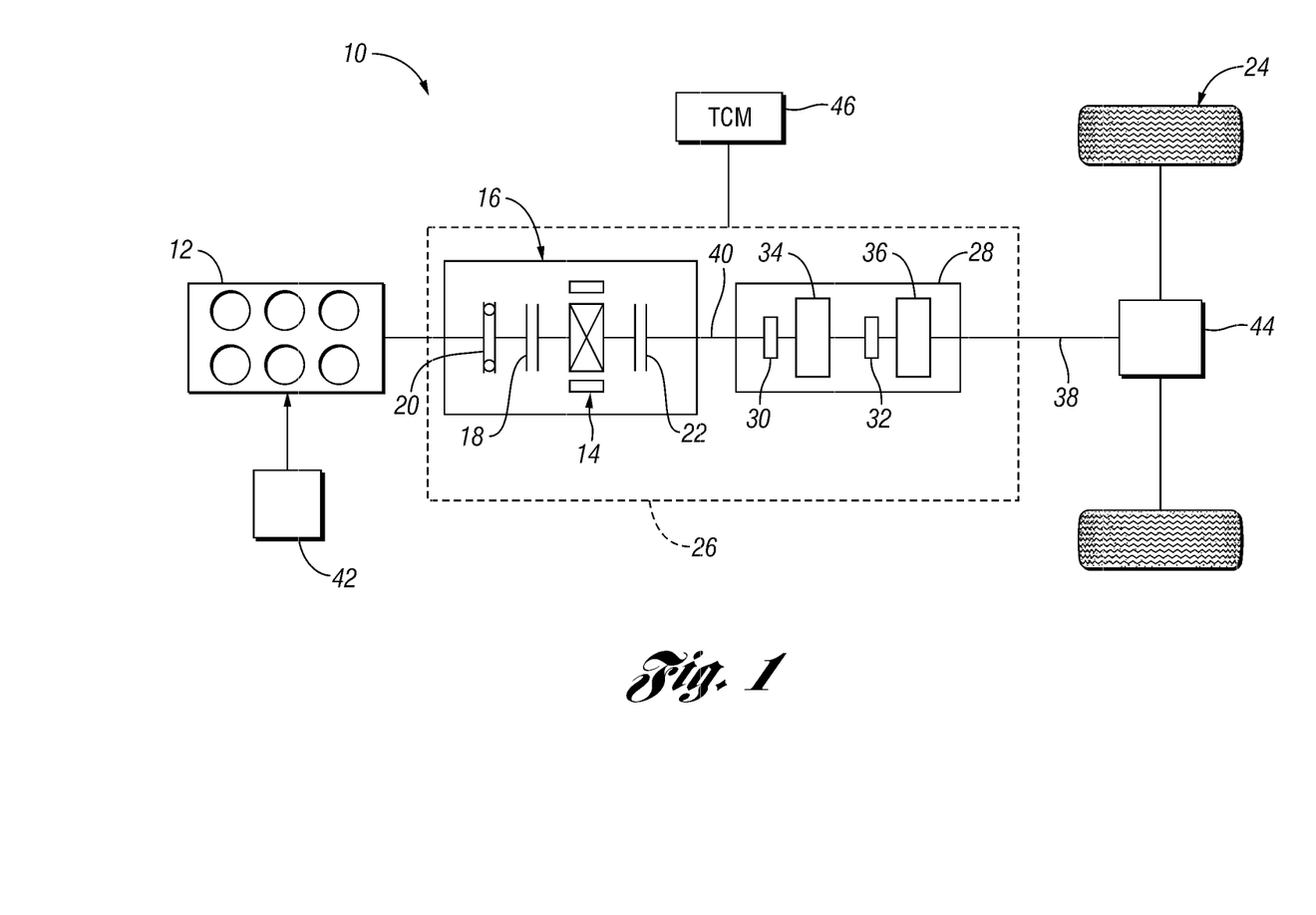
FIG. 1 is a schematic diagram of a vehicle in accordance with the present invention.

FIG. 1 shows a schematic diagram of the vehicle 10 in accordance with the present invention. The vehicle 10 is an HEV, and includes an engine 12, and an electric machine, which, in the embodiment shown in FIG. 1, is a M/G 14. The M/G 14 is part of a clutch/motor housing 16 that further includes a first clutch 18, or disconnect clutch and a damper 20 disposed between the disconnect clutch 18 and the engine 12. The damper 20 may be, for example, a series of plates and springs configured to help dampen changes in torque transferred between the engine 12 and the M/G 14 when the disconnect clutch 18 is being engaged. The clutch/motor housing 16 also includes a launch clutch 22, which, as described in more detail below, can be controlled to isolate the M/G 14 from vehicle drive wheels 24. Although the clutches 18, 22 are described and illustrated as hydraulic clutches, other types of clutches, such as electromechanical clutches may also be used.

The clutch/motor housing 16 is part of a transmission 26 that also includes a gear box 28. Like the rest of FIG. 1, the gear box 28 is illustrated as a simple schematic figure to reduce unnecessary complexity in the drawing figure. The gear box 28 includes two transmission clutches 30, 32 and two planetary gear sets 34, 36. It is understood that other gear box configurations can be used in a vehicle, such as the vehicle 10, and in methods contemplated by the present invention. As described in more detail below, the clutches 30, 32 can be controlled through a shift schedule, such as a production shift schedule, that connects and disconnects certain elements of the planetary gear sets 34, 36 to control the ratio between a transmission output 38 and a transmission input 40.

The vehicle 10 also includes a starter motor 42 operatively connected to the engine 12, for example, through a belt or gear drive. A differential 44 is disposed between the transmission output 38 and the vehicle drive wheels 24. In addition, the vehicle 10 includes a control system, which, in the embodiment shown in FIG. 1, is a TCM 46. As described above, a control system for a vehicle, such as the vehicle 10, can include any number of controllers, some or all of which may be connected through a CAN or other communication system. As described in detail below, the TCM 46 can be configured to control operation of the various components of the transmission 26 in conjunction with the operation of the starter motor 42 and the engine 12, such that the engine 12 can be started under any of a number of different conditions in a way that minimizes or eliminates torque disturbances and impact on the driver.

Figure 2:
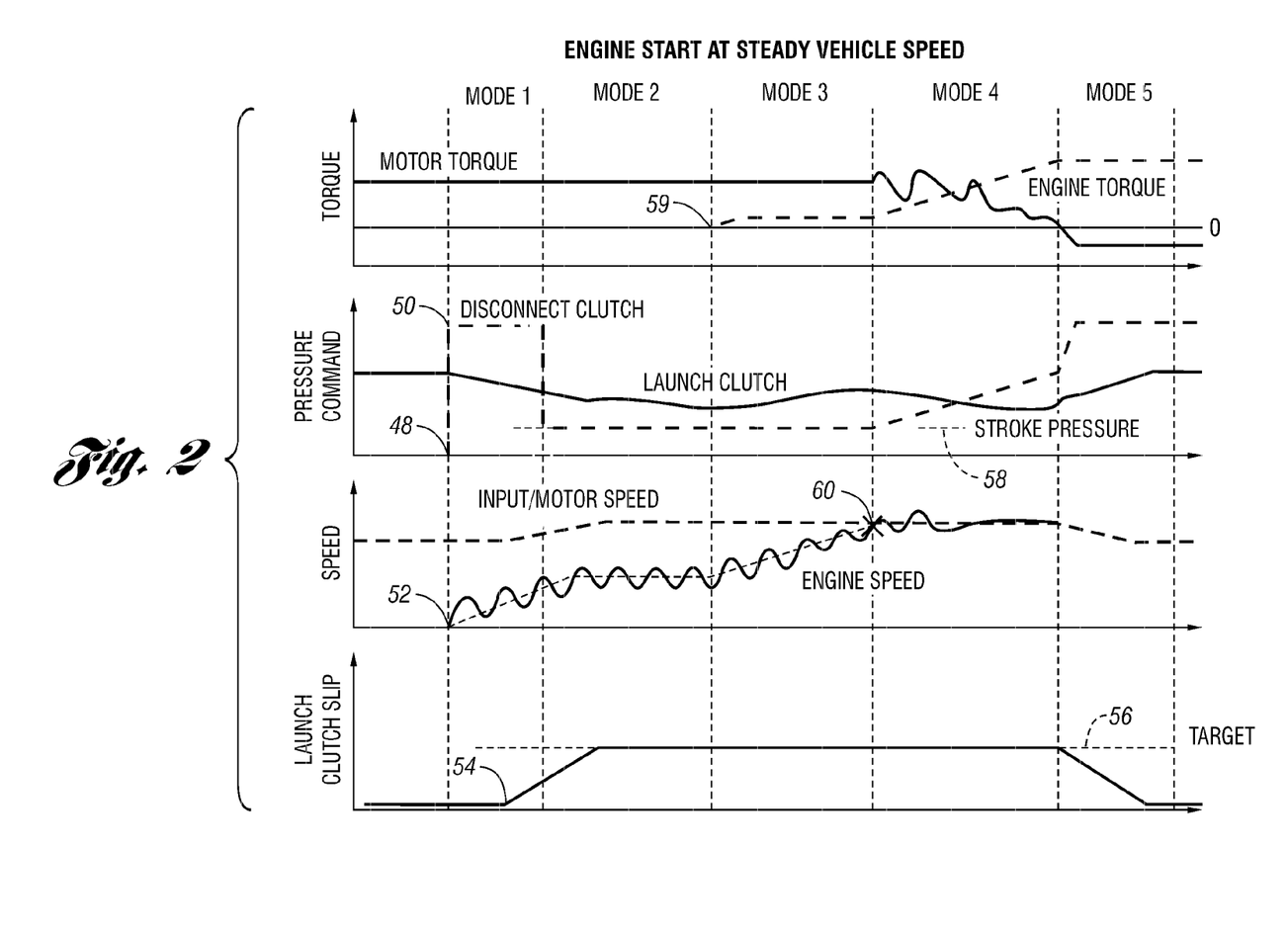
FIG. 2 is a graph illustrating how various parameters of the vehicle shown in FIG. 1 change over time during an engine start at steady vehicle speed.

Four different engine start modes are now described in detail using FIGS. 2-5 with reference to the vehicle 10 shown in FIG. 1. FIG. 2 shows a diagram of a method for engine start in accordance with embodiments of the present invention, when the vehicle 10 is operating at substantially steady speed. Of course, the vehicle speed can be changing somewhat, but it is contemplated that no transmission downshifts will occur during the engine start routine for the situation illustrated in FIG. 2. As shown in FIG. 2, the engine start is requested at the start of Mode 1. Illustrated at point 48 is the pressure of the disconnect clutch 18 when the engine start is requested. At point 48, the pressure in the disconnect clutch 18 is essentially zero—i.e., the disconnect clutch 18 is completely or substantially disengaged. In Mode 1, the disconnect clutch pressure is raised to a first level by a rapid fill to a level indicated at point 50.

As described above, control of the disconnect clutch 18 can be effected by the TCM 46, and although the initial fill is a "rapid fill", it does not need to be. It is worth noting that even though the pressure command in the disconnect clutch 18 is relatively high when the rapid fill takes place in Mode 1, the actual pressure is small, and if any torque is transferred between the M/G 14 and the engine 12 during Mode 1, it will be a very small amount, and not enough to turnover the engine 12. Thus, it may be said that the torque transfer in such a situation is less than an "engine turnover torque"—i.e., it is zero torque, or an amount incapable of turning over the engine 12. Any torque transfer in such a situation is merely the result of a small amount of drag between the clutch plates that can occur when the plates are brought into close proximity with each other to facilitate subsequent rapid engagement.

Also at the start of Mode 1, substantially simultaneously with the rapid fill of the disconnect clutch 18, the starter motor 42 is initiated to start cranking the engine 12—see point 52 on FIG. 2. Also during Mode 1, the launch clutch 22 is controlled to start slipping at point 54 with the goal of reaching a target slip speed 56. During Mode 1, the M/G 14 (referred to a "motor" in FIGS. 2-6) is controlled such that its output torque is essentially steady to continue to drive the vehicle, and it is controlled by the TCM 46 using torque control. Torque control is a method of controlling a torque-producing device such that the output speed of the device is allowed to vary while the output torque is controlled to a desired level. At the end of Mode 1, the pressure in the disconnect clutch 18 is reduced to a second level to the stroke pressure 58, such that there is negligible or no torque transferred between the M/G 14 and the engine 12—i.e., the torque transfer is less than an engine turnover torque. If engine start is detected at the end of Mode 1, Mode 2 will be skipped and Mode 3 will begin; conversely, if engine start is not detected, Mode 2 will begin.

In Mode 2, the disconnect clutch 18 will remain at the stroke pressure 58. The launch clutch 22 is controlled until it reaches the target slip speed 56, at which time it is controlled according to a closed loop controller, such as a PID controller, such that it remains at or near the target slip speed 56—it is controlled "around" the target slip 56. The M/G 14 continues to be controlled using torque control based on a driver demand table. Also during Mode 2, the engine 12 continues to be cranked using the starter motor 42 until engine start is detected. Engine start may be detected, for example, when the engine 12 begins to output positive torque. This is shown at point 59 in FIG. 2. Then, the starter motor is shut off and Mode 2 is ended.

In Mode 3, the pressure in the disconnect clutch 18 is held at the stroke pressure. The slip in the launch clutch 22 continues to be controlled using the closed loop pressure control to maintain it at or near the target slip 56. The M/G 14 is maintained in torque control mode, but the engine 12 is operated in speed control mode. During speed control, the amount of torque output by the engine 12 is allowed to vary, while the speed is controlled—in this case, the speed is controlled to try to match the M/G 14 speed. The speed of the engine 12 is controlled according to a profile based on, for example, a comparison of the current engine speed to the M/G speed.

Mode 4 begins when the speed of the engine 12 is within a calibratable amount of the speed of the M/G 14—see point 60. During Mode 4, the disconnect clutch 18 is locked up with a ramp rate that is dependent on the slip in the clutch, where the clutch slip is defined as the difference between the engine speed and the M/G speed. The engine 12 is placed in torque control based on a driver demand for torque. The M/G 14 is placed in speed control mode based on current vehicle acceleration. As an alternative, the M/G 14 could be maintained in torque control mode, while cross-linking a decrease in M/G torque with an increase in engine torque. When the torque of the M/G 14 consistently drops to zero or below, Mode 4 is ended, and the final engine start routines are performed. By "consistently drops to zero or below," it is meant that the torque of the M/G 14 has not anomalously hit zero or is not determined to be zero because of a noisy signal.

In Mode 5, the pressure and the disconnect clutch 18 is raised to a maximum, and the pressure in the launch clutch 22 is smoothly raised until it is locked. The engine 12 continues to be controlled using torque control based on driver-demanded torque, and the M/G 14 can be used as a generator based on the needs of the battery or other electrical energy requirements of the vehicle 10. When the launch clutch 22 is no longer slipping, Mode 5 is exited and the engine start routine is complete.

Figure 3:
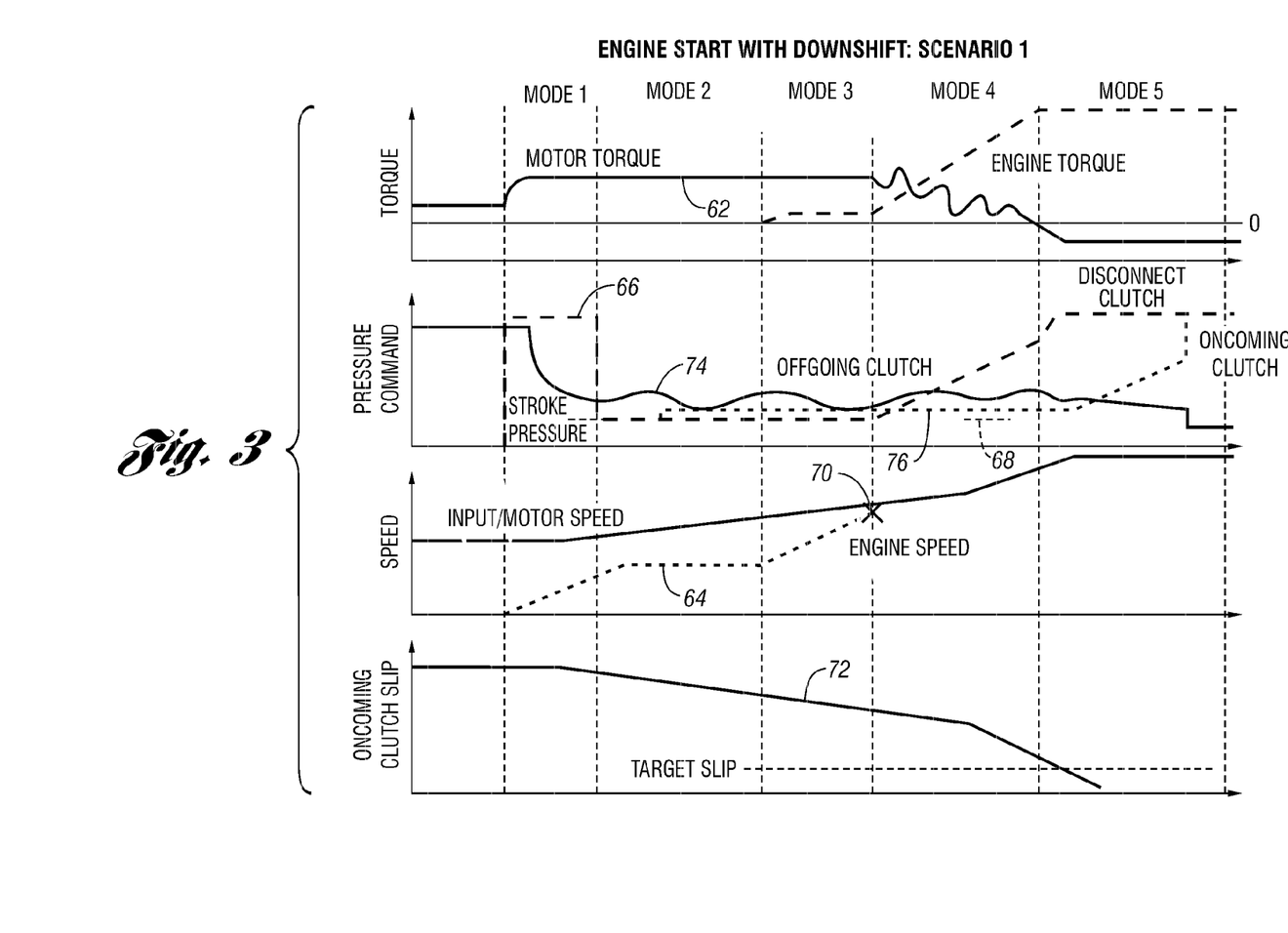
FIG. 3 is a graph illustrating how various parameters of the vehicle shown in FIG. 1 change over time when an engine start is requested during a downshift under one scenario.

FIG. 3 shows various vehicle parameters during an engine start where a transmission downshift occurs during the engine start routine. During the engine start illustrated in FIG. 3, it is contemplated that the engine will be engaged before the downshift completes; hence, FIG. 3 is further labeled "Scenario 1" to distinguish it from FIG. 4—Scenario 2—where it is contemplated that the downshift will be complete or nearly complete before the engine is engaged. Control of the engine start in this situation is more complex than when the vehicle 10 is traveling at steady speed, and use of the present invention as described herein overcomes the problem of torque disturbances even during this complex control situation.

Returning to FIG. 3, it is shown that the pressure profile of the disconnect clutch is similar to the profile used in FIG. 2. The disconnect clutch 18 is initially filled at the beginning of Mode 1, and the starter motor 42 is operated substantially simultaneously with the initial fill of the disconnect clutch 18. One notable difference between the engine start at steady state and the engine start with downshift, is that it is not the launch clutch 22 that is controlled to slip to isolate torque disturbances from the driveline; rather, it is the transmission clutches 30, 32—one of which is an oncoming clutch, the other of which is offgoing clutch—that are controlled to provide slip between the M/G 14 and the vehicle drive wheels 24.

The pressure profiles for the oncoming clutch and the offgoing clutch are shown adjacent the pressure profile for the disconnect clutch, and the slip of the oncoming clutch is shown at the bottom of FIG. 3. Throughout Mode 1, the M/G 14 is controlled by torque control based on, for example, a driver demand table. The driver demand table relates one or more driver inputs, such as a position of an accelerator pedal, to a required M/G 14 output torque. The torque profile 62 for the M/G 14 is illustrated at the top of FIG. 3.

Also during Mode 1, the starter motor 42 begins to crank the engine 12, as shown by the engine speed profile 64. The disconnect clutch 18 is provided with a rapid fill to bring it to a level 66, and at the end of the initial fill of the disconnect clutch 18, Mode 1 is ended. If engine start is detected at the end of Mode 1, Mode 2 will be skipped and Mode 3 will begin; conversely, if engine start is not detected, Mode 2 will begin.

At the start of Mode 2, the pressure in the disconnect clutch 18 is reduced to a second level, which is the stroke pressure 68 as described above. In the embodiment shown in FIG. 3, the pressures in the oncoming and offgoing clutches 30, 32 are controlled according to a production shift schedule. This is a shift schedule preprogrammed into the TCM 46 and is used to control operation of the clutches 30, 32 during various upshifts and downshifts. If desired, a different shift schedule could be used during the engine start routine when a downshift occurs. As before, Mode 2 is ended, and the starter motor 42 shut off, when the engine 12 is fueled and engine start is detected, for example, when the engine 12 outputs positive torque. In other embodiments, the starter motor 42 can be shut off based on other vehicle conditions, for example, an absolute value of engine speed, a relative speed of the engine 12 compared to the starter motor 42, a certain level of engine torque, or some other parameter.

In Mode 3, the M/G 14 is maintained in torque control mode based on a driver demand table. A closed loop speed control is used to control the speed of the engine 12 according to a profile based on, for example, a comparison of the current engine speed to the M/G speed. Thus, the engine speed is controlled according to the profile 64 to try to match the engine speed with the speed of the M/G 14. Mode 3 is exited when the speed of the engine 12 is a certain calibratable level below the speed of the M/G 14—this is shown at point 70 in FIG. 3.

In Mode 4, the disconnect clutch 18 is locked, and similar to Mode 3, the oncoming and offgoing clutches continue to be controlled according to the shift schedule in use—see slip profile 72 and pressure profiles 74, 76 in FIG. 3. During Mode 4, the engine 12 is placed in torque control and operated based on driver-demanded torque. When the torque of the M/G 14 consistently drops to zero or below, thereby indicating that the engine torque is able to maintain the vehicle speed, Mode 4 is ended.

During Mode 5, the disconnect clutch pressure is brought to a maximum and control of the engine is maintained in torque control based on the torque demanded by the driver. Just as in Mode 4, control of the oncoming and offgoing clutches is maintained according to the shift schedule. Also during Mode 5, the M/G 14 can be placed in generator control depending on the battery charge or other electrical requirements, or the performance needs, of the vehicle 10. Mode 5 and the engine start routine is complete when the oncoming and offgoing clutches have completed their transition according to the shift schedule.

Figure 4:
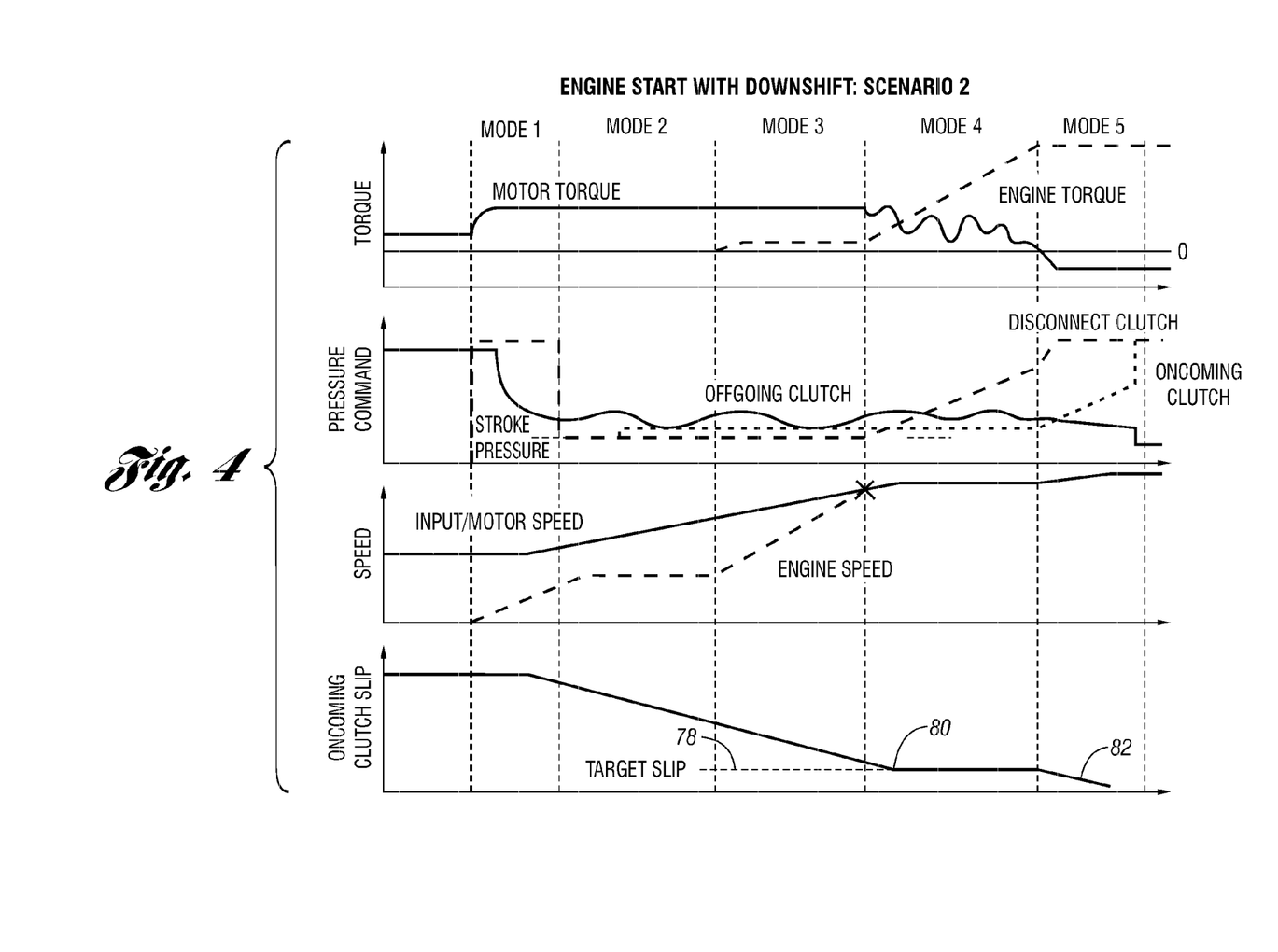
FIG. 4 is a graph illustrating how various parameters of the vehicle shown in FIG. 1 change over time when an engine start is requested during a downshift under a second scenario.

As noted above, FIG. 4 illustrates a second scenario in which an engine start is requested during a downshift event. In FIG. 4, the downshift has begun prior to the request of engine start, and is therefore very nearly complete before the engine 12 is engaged. The description for Modes 1 and 2 used for FIG. 3 are equally applicable to the engine start routine illustrated in FIG. 4. In Mode 3, however, the slip of the oncoming clutch is examined, and if it is greater than a target 78, control is maintained according to the production shift schedule, or whatever other schedule is in use. If the slip of the oncoming clutch reaches the target 78, it is then maintained at or near the target 78 by using closed loop control on the offgoing clutch and by keeping the pressure in the oncoming clutch just above the stroke pressure.

In the embodiment shown in FIG. 4, the slip of the oncoming transmission clutch reaches the target slip 78 early on in Mode 4—this is shown at point 80. Throughout the rest of Mode 4, the oncoming and offgoing clutches are controlled as described above in Mode 3, such that the slip of the oncoming clutch remains at or near the target 80. During Mode 5, the disconnect clutch 18 is brought to maximum pressure, and the operation of the oncoming and offgoing transmission clutches 30, 32 is completed according to the relevant shift schedule—see oncoming clutch slip profile 82. This ends Mode 5 and the engine start routine shown in FIG. 4.

Figure 5:
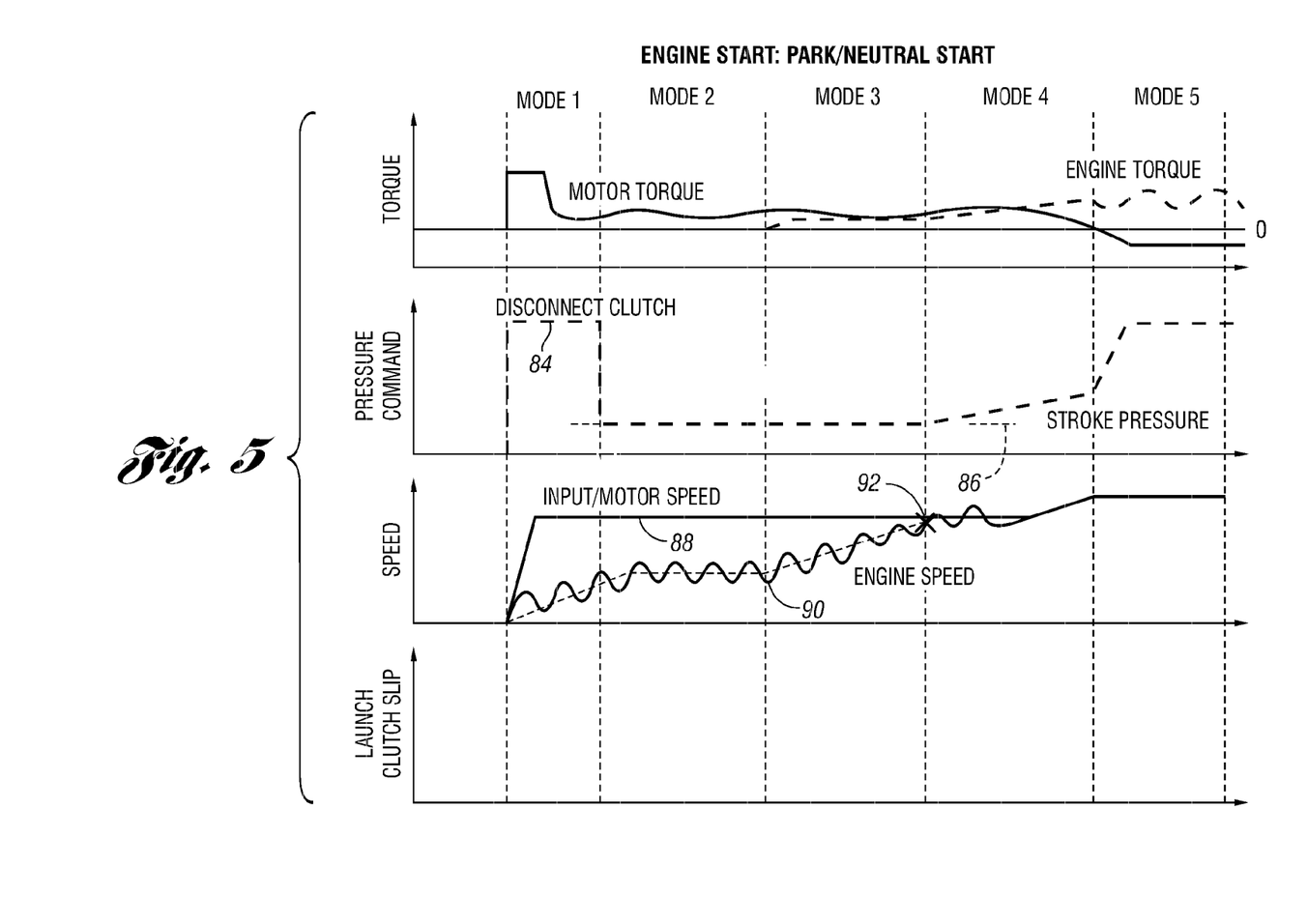
FIG. 5 is a graph illustrating how various parameters of the vehicle shown in FIG. 1 change over time when an engine start is requested and the vehicle is at rest.

FIG. 5 illustrates an engine start different from any of the other three engine start routines described above. In FIG. 5, it is contemplated that the vehicle is not moving during the engine start request. Thus, the vehicle 10 is in a park or neutral gear, and the engine start request may come not from a driver demand for increased power, but rather from the vehicle being started by the driver via a "key start". Like the other engine start routines described above, Mode 1 begins with the disconnect clutch 18 undergoing an initial fill to a level indicated at 84, during which time the starter motor 42 is engaged substantially simultaneously with the initial fill of the disconnect clutch 18.

Unlike the other engine start routines described above, the M/G 14 is initially placed in a speed control, where it is held at a calibratable speed level below the desired engine idle speed. Another difference between a key start and other engine start routines is that an auxiliary electric pump may be used to provide the initial fill requirements of the disconnect clutch 18. If the M/G 14 is operating when the engine start is requested, such as illustrated in FIGS. 2-4, the M/G 14 can operate a primary hydraulic pump. With the key start, however, the M/G 14 is not operating and an auxiliary electric pump can be used. At the end of the initial fill of the disconnect clutch 18, the pressure is reduced to the stroke pressure 86, and Mode 1 is ended. As with the previous control schemes, the method may go to Mode 2, or if engine start is detected, bypass Mode 2 and go directly to Mode 3.

In Mode 2, the disconnect clutch 18 is held at the stroke pressure 86, and the M/G 14 continues to be controlled using unidirectional speed control such that its speed is held to a calibratable level below a desired engine idle speed—see motor speed profile 88 in FIG. 5. Mode 2 is ended when engine start is detected.

In Mode 3, the M/G 14 continues to be controlled according to speed control, with a speed target being a calibratable amount below a desired engine idle speed. The engine is controlled according to a closed loop speed control—see engine speed control profile 90 shown in FIG. 5. Mode 3 is ended at point 92, when the speed of the engine 12 is a calibratable amount below the speed of the M/G 14.

In Mode 4, the pressure of the disconnect clutch 18 is increased toward its maximum pressure, the engine 12 and M/G 14 are both maintained in speed control mode, and Mode 4 is exited when the torque of the M/G 14 consistently drops to zero or below, indicating that the engine torque is able to maintain the vehicle speed. In Mode 5, the pressure of the disconnect clutch 18 is brought to a maximum, the engine is controlled at an idle speed based on idle speed control parameters, which may be a pre-programmed production idle speed control maintained by an ECU (not shown in FIG. 1). As before, the M/G 14 can then be placed in generator torque control based on the needs of the battery or other electrical system needs. Mode 5 is ended and the engine start routine complete when the desired torque of the M/G 14 and the desired disconnect clutch pressure are attained.

Figure 6:
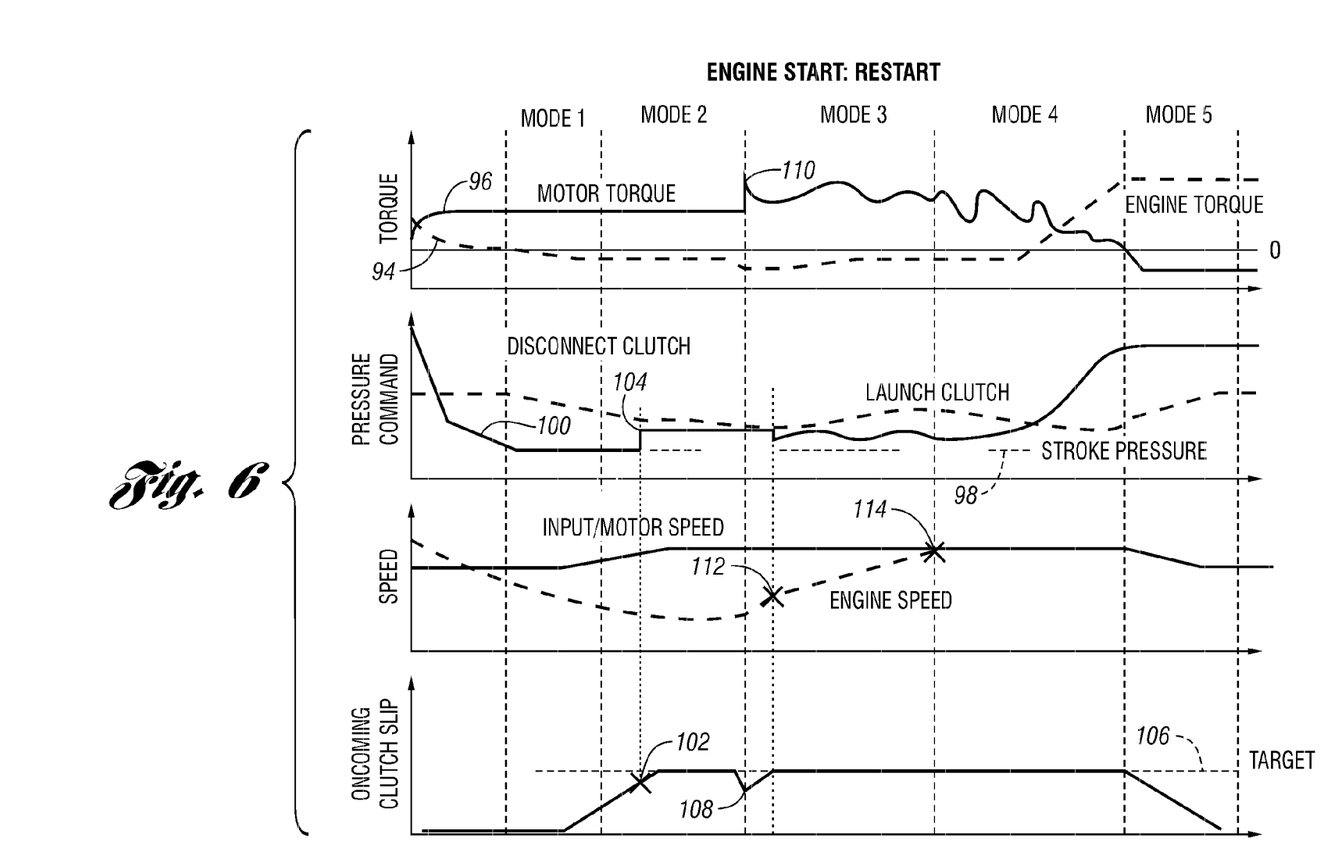
FIG. 6 is a graph illustrating how various parameters of the vehicle shown in FIG. 1 change over time when an engine start is requested during an engine shutdown.

FIG. 6 illustrates the situation where an engine start routine takes place before a previous engine shutdown sequence has completed. This may occur, for example, if an engine shutdown is initiated, but before it is complete, the driver demands a sharp increase in vehicle speed. The graph in FIG. 6 starts prior to Mode 1, and diagrams various parameters when an engine shutdown is initiated. The engine shutdown is characterized by the torque of the engine 12 going to zero—see engine torque profile 94. Substantially simultaneously, the torque of the M/G 14 is increased—see profile 96—to maintain the vehicle speed according to driver demand. The disconnect clutch 18 is commanded to stroke pressure 98 as shown in the pressure profile 100. The launch clutch 22 is maintained in a locked position such that torque is transferred substantially without slip to the vehicle wheels 24.

In Mode 1, the engine start is initiated. The stroke pressure 98 is maintained on the disconnect clutch 18, and the launch clutch 22 is allowed to slip to initiate isolation of the vehicle wheels 24 from the M/G 14. The M/G 14 continues to be operated in torque control mode according to a driver demand table. Mode 1 is ended when the slip in the launch clutch 22 is above a calibratable threshold.

During Mode 2, the disconnect clutch 18 is maintained at the stroke pressure 98 until a calibratable level of slip is detected in launch clutch—this is shown at point 102 in FIG. 6. Then, a calibratable amount of pressure is added to the disconnect clutch 18 to bring the pressure to a third level—this is shown at point 104. Slip in the launch clutch 22 is increased by ramping its pressure down, until it reaches a target pressure 106, after which time the pressure is maintained using closed loop control. The M/G 14 is maintained in torque control based on a driver demand table, and when a dip is detected in the slip of the launch clutch 22—see point 108, the M/G torque is boosted by a calibratable amount—see point 110. Mode 2 is exited when the engine speed is within a calibratable level above the minimum engine speed necessary to maintain engine idle—see point 112.

In Mode 3, the disconnect clutch 18 is maintained according to a slip speed profile of the engine speed using closed loop pressure control. The launch clutch slip is also maintained using closed loop pressure control, and the motor is placed in speed control to maintain a speed proportional to the existing vehicle acceleration. Mode 3 is ended at point 114, when the speed of the engine 12 is a calibratable amount below the speed of the M/G 14.

During Mode 4, the pressure in the disconnect clutch 18 is increased to the line pressure—i.e., the pressure is raised to the maximum available pressure. Engine start is initiated by fueling the engine 12, and the engine is placed in torque control based on driver demanded torque. The M/G 14 is maintained in speed control mode based on current vehicle acceleration. As an alternative, the M/G 14 could be maintained in torque control mode, while cross-linking a decrease in M/G torque with an increase in engine torque. When the torque of the M/G 14 consistently drops to zero or below, Mode 4 is ended.

In Mode 5, the line pressure is maintained on the disconnect clutch 18, and the pressure in the launch clutch 22 is smoothly raised until it is locked. The engine 12 continues to be controlled using torque control based on driver-demanded torque, and the M/G 14 can be used as a generator based on the needs of the battery or other electrical energy requirements of the vehicle 10. When the launch clutch 22 is no longer slipping, Mode 5 is exited and the engine start routine is complete.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for starting an engine in a hybrid vehicle being driven by an electric machine, the vehicle having a first clutch located between the engine and the starter motor and at least one other clutch disposed between the electric machine and vehicle drive wheels, the at least one other clutch being selectively engageable for facilitating torque transfer between the electric machine and the vehicle drive wheels, the method comprising:

initiating operation of a starter motor;
   reducing the pressure of the first clutch to a second level while the starter motor is operating;
   detecting engine start;
   stopping the starter motor;
   increasing the speed of the engine to approach that of the electric machine;
   engaging a first clutch connecting the engine to the electric machine;
   requesting an engine shutdown in response to a reduced engine demand and disengaging the first clutch;
   requesting an engine start after an engine shutdown is initiated and the engine is still operating in response to an increased engine demand;
   initiating slip in at least one of the at least one other clutch; and
   raising the pressure of the first clutch to to facilitate torque transfer from the electric machine to the engine when the slip in the at least one of the at least one other clutch has reached a predetermined level.

2. The method of claim 1, wherein engine start is detected when the engine outputs positive torque.

3. The method of claim 1, the vehicle wherein the at least one other clutch including a plurality of transmission clutches, and at least a portion of an engine start sequence occurs during a transmission downshift, the method further comprising:

controlling oncoming and offgoing transmission clutches during a downshift according to a predetermined shift schedule, thereby effecting slip between the electric machine and the vehicle drive wheels; and
   controlling the engine using speed control based on a speed profile determined from a difference between the engine speed and the speed of the electric machine.

4. The method of claim 1, wherein the step of engaging the first clutch is performed after the speed of the engine is within a calibratable level of the speed of the electric machine.

5. The method of claim 1, further comprising:

operating the electric machine using torque control according to driver demand;
   controlling the slip in the launch clutch around a target slip; and
   increasing torque output of the electric machine when a detectable drop in the launch clutch slip occurs.

6. The method of claim 5, further comprising controlling the pressure in the first clutch according to a closed loop pressure control to maintain a slip profile based on the engine speed.

7. A method for starting an engine in a hybrid vehicle being driven by an electric machine, the vehicle having a first clutch located between the engine and the starter motor and at least one other clutch disposed between the electric machine and vehicle drive wheels, the at least one other clutch being selectively engageable for facilitating torque transfer between the electric machine and the vehicle drive wheels, the method comprising:

requesting an engine start when the engine is shutdown and a first clutch connecting the engine to the electric machine is open;
   initiating operation of the starter motor such that torque is transferred from the starter motor to the engine;
   raising the pressure in a first level to a first level, while operating the starter motor, to cause the first clutch to slip such that less than an engine turnover torque is transferred from the electric machine to the engine;

stopping the starter motor upon detecting engine start;

fully engaging the first clutch;

controlling oncoming and offgoing transmission clutches during a downshift according to a predetermined shift schedule, thereby effecting slip between the electric machine and the vehicle drive wheels;

determining an amount of slip between the electric machine and the vehicle drive wheels;

continuing to control the on-going and offgoing clutches according to the predetermined shift schedule if the determined slip is above a target slip; and controlling the on-going and offgoing clutches through a closed loop control around the target slip if the determined slip is not above the target slip.

8. The method of claim 7, wherein the step of operating the electric machine is performed such that the electric machine is operated using torque control according to a driver demand for torque.

9. The method of claim 7, wherein the electric machine is not operating when the engine start is requested, and the step of operating the electric machine is performed such that the electric machine is operated in speed control to control the speed of the electric machine within a calibratable level below a desired engine idle speed.

10. The method of claim 7, further comprising:

requesting an engine start after an engine shutdown is initiated and the engine is still operating;

initiating slip in the launch clutch; and raising the pressure of the first clutch to a third level to facilitate torque transfer from the electric machine to the engine when the slip in the launch clutch has reached a predetermined level.

11. The method of claim 10, further comprising:

operating the electric machine using torque control according to driver demand;

controlling the slip in the launch clutch around a target slip; and increasing torque output of the electric machine when a detectable drop in the launch clutch slip occurs.

12. The method of claim 11, further comprising controlling the pressure in the first clutch according to a closed loop pressure control to maintain a slip profile based on the engine speed.

13. A hybrid vehicle comprising:

an engine;

a starter motor for rotating the engine to facilitate an engine start;

an electric machine operable to propel the vehicle and to rotate the engine;

a first clutch disposed between the engine and the electric machine for selectively connecting the engine to the electric machine; and a control system including at least one controller, the control system being configured to:

request an engine start when the engine is shutdown and the first clutch is open;

operate the electric machine;

initiate operation of the starter motor such that torque is transferred from the starter motor to the engine;

reduce the pressure of the first clutch to a second level while the starter motor is operating;

fuel the engine, thereby facilitating torque production by the engine;

detect engine start;

stop the starter motor;

engage the first clutch;

wherein the control system is further configured to:

control oncoming and offgoing transmission clutches during a downshift according to a predetermined shift schedule to effect slip between the electric machine and the vehicle drive wheels;

determine an amount of slip between the electric machine and the vehicle drive wheels;

continue to control the on-going and offgoing clutches according to the predetermined shift schedule if the determined slip is above a target slip; and control the on-going and offgoing clutches through a closed loop control around the target slip if the determined slip is not above the target slip.

14. The vehicle of claim 13, wherein the control system is further configured to operate the electric machine using torque control according to a driver demand for torque.

15. The vehicle of claim 13, wherein the electric machine is shutdown when the engine start is requested, and the control system is further configured to operate the electric machine in speed control to control the speed of the electric machine within a calibratable level below a desired engine idle speed.

16. The vehicle of claim 13, further comprising a launch clutch, the control system being further configured to:

request an engine start after an engine shutdown is initiated and the engine is still operating;

initiate slip in the launch clutch; and raise the pressure of the first clutch to a third level to facilitate torque transfer from the electric machine to the engine when the slip in the launch clutch has reached a predetermined level.

17. The vehicle of claim 16, wherein the control system is further configured to:

operate the electric machine using torque control according to driver demand;

control the slip in the launch clutch around a target slip; and increase torque output of the electric machine when a detectable drop in the launch clutch slip occurs.

* * * * *